United States Patent
El Harouni et al.

(10) Patent No.: US 11,277,310 B2
(45) Date of Patent: Mar. 15, 2022

(54) SYSTEMIC ADAPTIVE DATA MANAGEMENT IN AN INTERNET OF THINGS ENVIRONMENT

(71) Applicant: International Business Machines Corporation, Armonk, NY (US)

(72) Inventors: Ahmed El Harouni, San Jose, CA (US); Samir Tata, Santa Clara, CA (US); Mohamed Mohamed, San Jose, CA (US); Aly Megahed, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 16/191,311

(22) Filed: Nov. 14, 2018

(65) Prior Publication Data

US 2020/0153695 A1   May 14, 2020

(51) Int. Cl.
| | |
|---|---|
| *H04L 29/12* | (2006.01) |
| *H04L 12/24* | (2006.01) |
| *G06F 8/61* | (2018.01) |
| *H04L 41/0893* | (2022.01) |
| *H04L 67/12* | (2022.01) |

(52) U.S. Cl.
CPC .......... *H04L 41/0893* (2013.01); *H04L 67/12* (2013.01)

(58) Field of Classification Search
CPC ............................ H04L 41/0893; H04L 67/12
See application file for complete search history.

(56) References Cited

U.S. PATENT DOCUMENTS

| | | | |
|---|---|---|---|
| 8,935,198 B1 | 1/2015 | Phillips et al. | |
| 9,407,646 B2 | 8/2016 | Cruz Mota et al. | |
| 9,600,494 B2 | 3/2017 | Maluf et al. | |
| 2006/0004868 A1* | 1/2006 | Claudatos | G06F 3/0649 |
| 2007/0294360 A1* | 12/2007 | Ebling | H04L 67/04 |
| | | | 709/208 |
| 2013/0083725 A1* | 4/2013 | Mallya | H04L 63/20 |
| | | | 370/328 |
| 2017/0023369 A1* | 1/2017 | Mohler | H04W 4/023 |
| 2018/0152517 A1* | 5/2018 | Zhong | H04L 41/0816 |
| 2018/0167435 A1* | 6/2018 | Kinarti | H04L 65/602 |
| 2019/0372952 A1* | 12/2019 | Higuchi | H04L 41/046 |

OTHER PUBLICATIONS

Anonymous, "NIST Cloud Computing Program," NIST, Information Technology Laboratory, Nov. 13, 2013, pp. 1-2, retrieved from www.nist.gov/itl/cloud/.
Mell et al., "The NIST Definition of Cloud Computing," Version 15, Dec. 7, 2009, pp. 1-2.

(Continued)

*Primary Examiner* — Wing F Chan
*Assistant Examiner* — Billy H Ng
(74) *Attorney, Agent, or Firm* — Zilka-Kotab, P.C.

(57) ABSTRACT

A computer-implemented method according to one embodiment includes identifying a plurality of policies to be implemented within a system, aggregating the plurality of policies to create an aggregated policy, disseminating the aggregated policy within the system, receiving data collected according to the aggregated policy, and disaggregating the data.

18 Claims, 7 Drawing Sheets

(56) References Cited

OTHER PUBLICATIONS

Mell et al., "The NIST Definition of Cloud Computing," Recommendations of the National Institute of Standards and Technology, NIST Special Publication 800-145, Sep. 2011, pp. 1-7.
Anonymous, "System and Method for Adaptive Protocol Based Smart Caching on Servers," Ip.com, Aug. 4, 2013, pp. 1-4.
Huacarpuma et al., "Distributed Data Service for Data Management in Internet of Things Middleware," Sensors, Apr. 27, 2017, pp. 1-25.
Anonymous, "Privacy Enabled Personal Information Dossier Service," IP.com, Nov. 4, 2014, pp. 1-3.

* cited by examiner

SYSTEMIC ADAPTIVE DATA MANAGEMENT IN AN INTERNET OF THINGS ENVIRONMENT

BACKGROUND

The present invention relates to internet of things (IoT) environments, and more specifically, this invention relates to optimizing policy implementation within IoT environments.

Internet of things (IoT) environments are very popular, and data created and processed within these environments is growing rapidly. An important goal of an IoT environment is to collect, store, and process data of value to tenants of the IoT environment. However, IoT environments also have resource (e.g., storage, processing, etc.) constraints, which need to be considered when performing such data collection, storage, and processing.

SUMMARY

According to one embodiment, a computer-implemented method includes identifying a plurality of policies to be implemented within a system, aggregating the plurality of policies to create an aggregated policy, disseminating the aggregated policy within the system, receiving data collected according to the aggregated policy, and disaggregating the data.

According to another embodiment, a computer program product for performing systemic adaptive data management includes a computer readable storage medium having program instructions embodied therewith, where the computer readable storage medium is not a transitory signal per se, and where the program instructions are executable by a processor to cause the processor to perform a method including identifying, by the processor, a plurality of policies to be implemented within a system, aggregating, by the processor, the plurality of policies to create an aggregated policy, disseminating, by the processor, the aggregated policy within the system, receiving, by the processor, data collected according to the aggregated policy; and disaggregating, by the processor, the data.

According to another embodiment, a system includes a processor, and logic integrated with the processor, executable by the processor, or integrated with and executable by the processor, where the logic is configured to identify a plurality of policies to be implemented within a system, aggregate the plurality of policies to create an aggregated policy, disseminate the aggregated policy within the system, receive data collected according to the aggregated policy, and disaggregate the data.

Other aspects and embodiments of the present invention will become apparent from the following detailed description, which, when taken in conjunction with the drawings, illustrate by way of example the principles of the invention.

DETAILED DESCRIPTION

The following description discloses several preferred embodiments of systems, methods and computer program products for performing systemic adaptive data management. Various embodiments provide a method for aggregating policies for dissemination within a system, and disaggregating data collected using the aggregated policies.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for performing systemic adaptive data management.

In one general embodiment, a computer-implemented method includes identifying a plurality of policies to be implemented within a system, aggregating the plurality of policies to create an aggregated policy, disseminating the aggregated policy within the system, receiving data collected according to the aggregated policy, and disaggregating the data.

In another general embodiment, a computer program product for performing systemic adaptive data management includes a computer readable storage medium having program instructions embodied therewith, where the computer readable storage medium is not a transitory signal per se, and where the program instructions are executable by a processor to cause the processor to perform a method including identifying, by the processor, a plurality of policies to be implemented within a system, aggregating, by the processor, the plurality of policies to create an aggregated policy, disseminating, by the processor, the aggregated policy within the system, receiving, by the processor, data collected according to the aggregated policy; and disaggregating, by the processor, the data.

In another general embodiment, a system includes a processor, and logic integrated with the processor, executable by the processor, or integrated with and executable by the processor, where the logic is configured to identify a plurality of policies to be implemented within a system, aggregate the plurality of policies to create an aggregated policy, disseminate the aggregated policy within the system, receive data collected according to the aggregated policy, and disaggregate the data.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
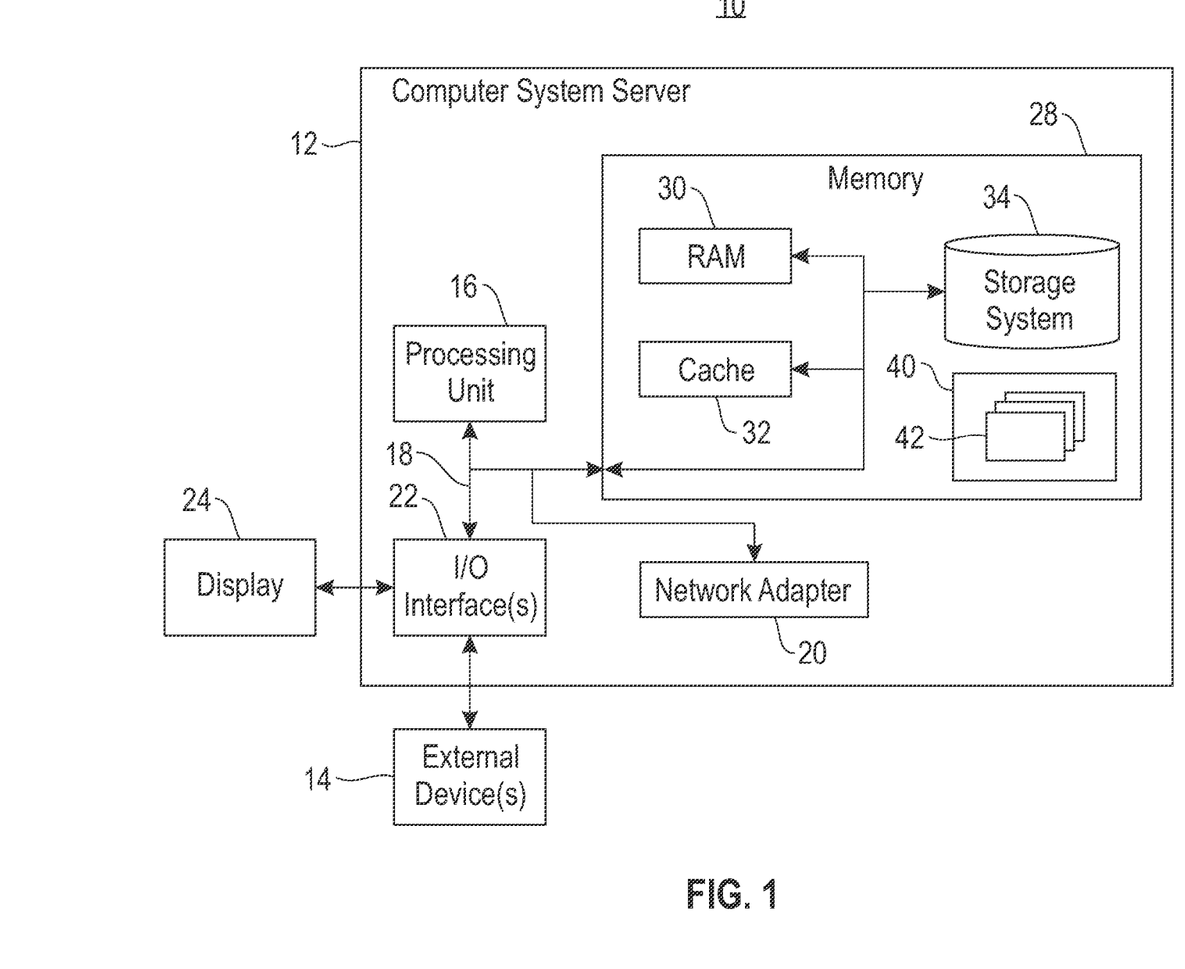
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
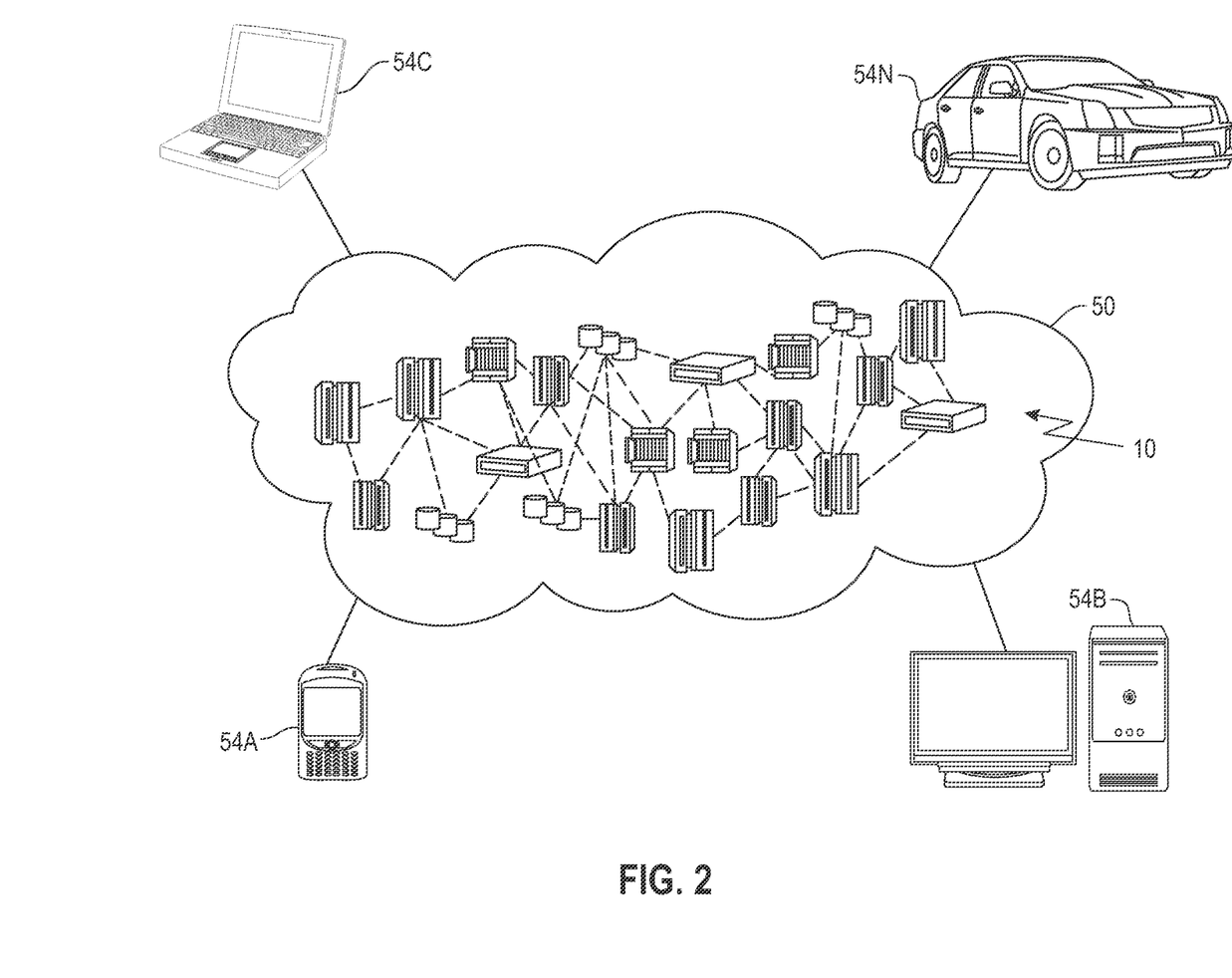
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
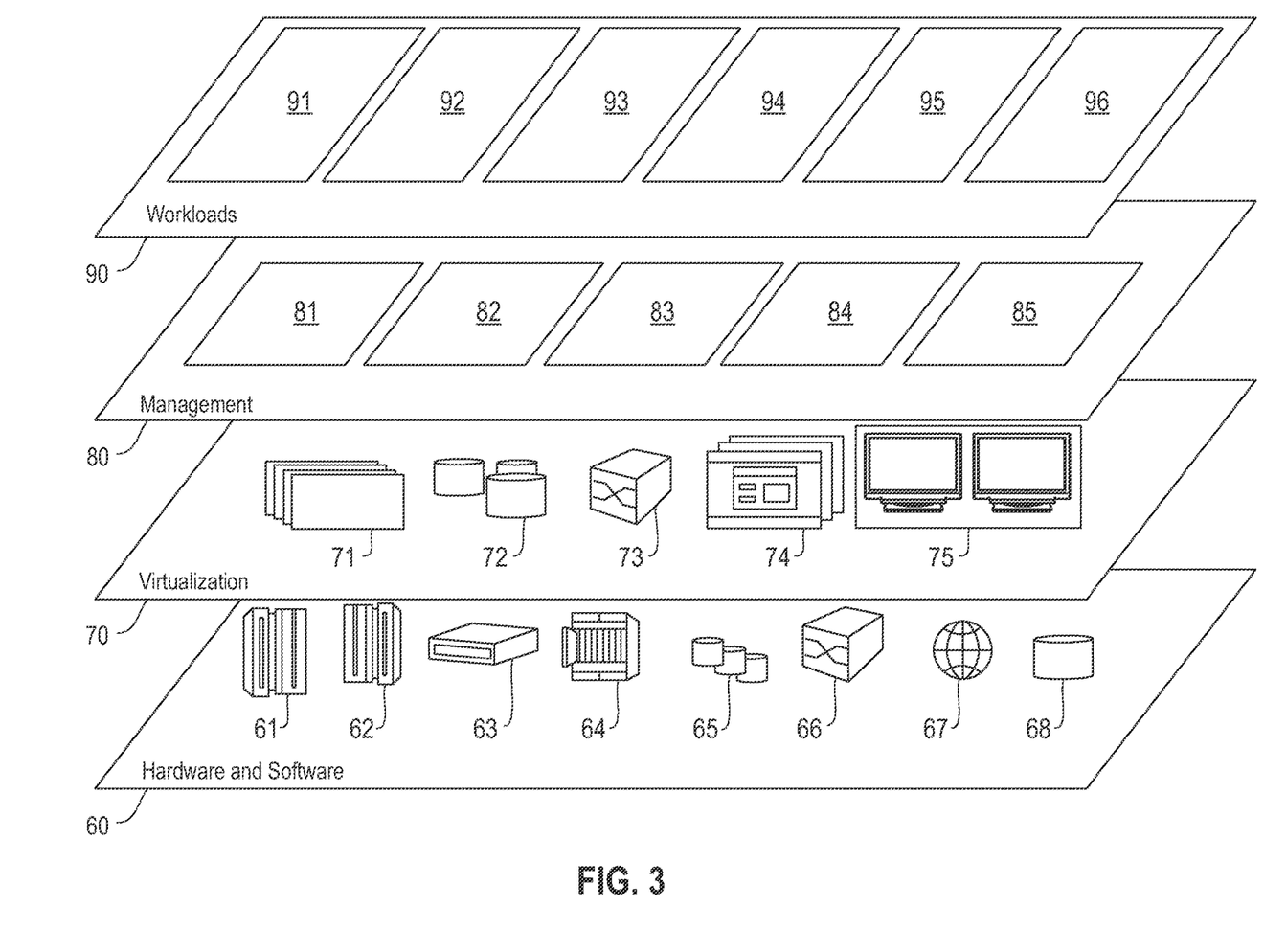
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and systemic adaptive data management 96.

Figure 4:
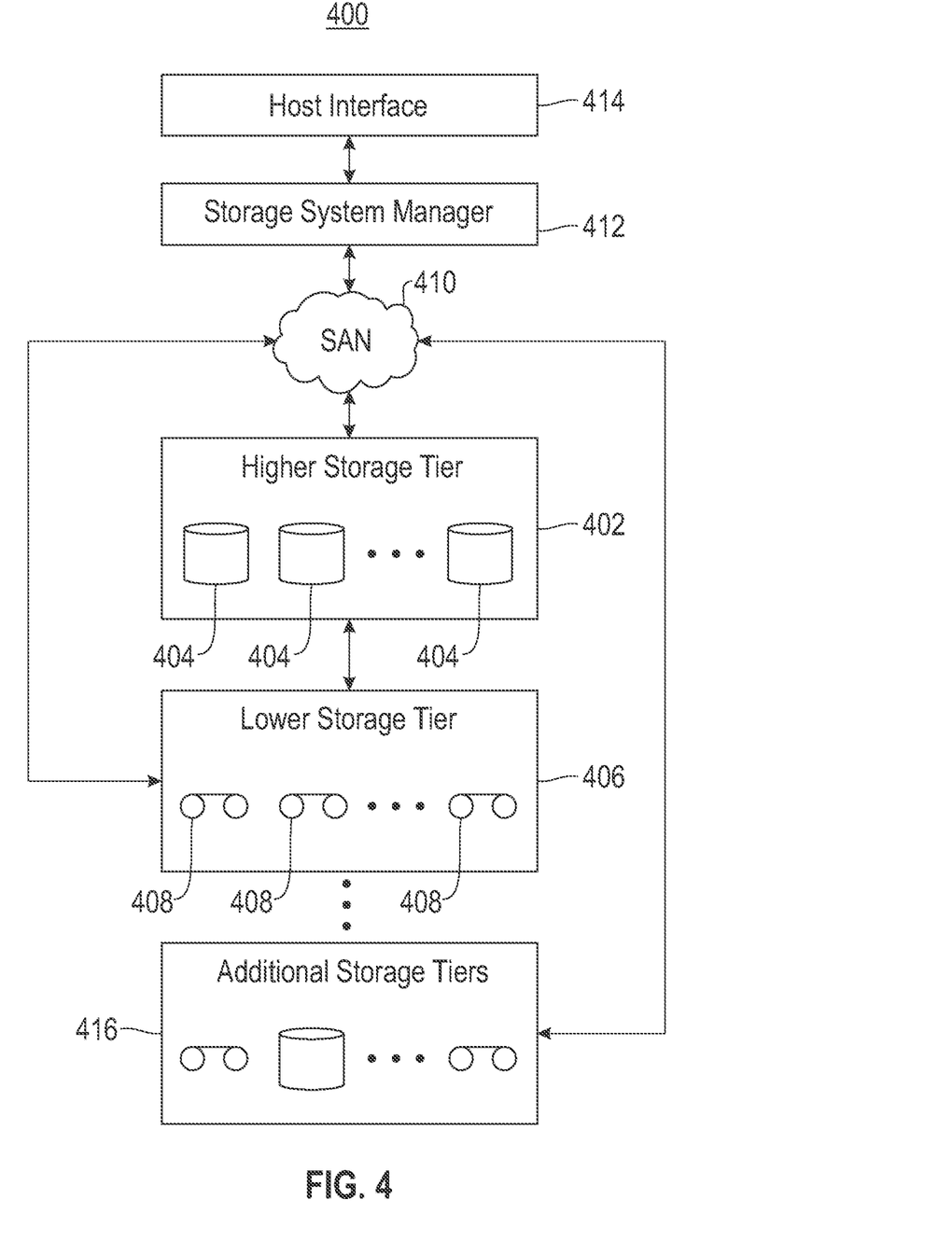
FIG. 4 illustrates a tiered data storage system in accordance with one embodiment.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
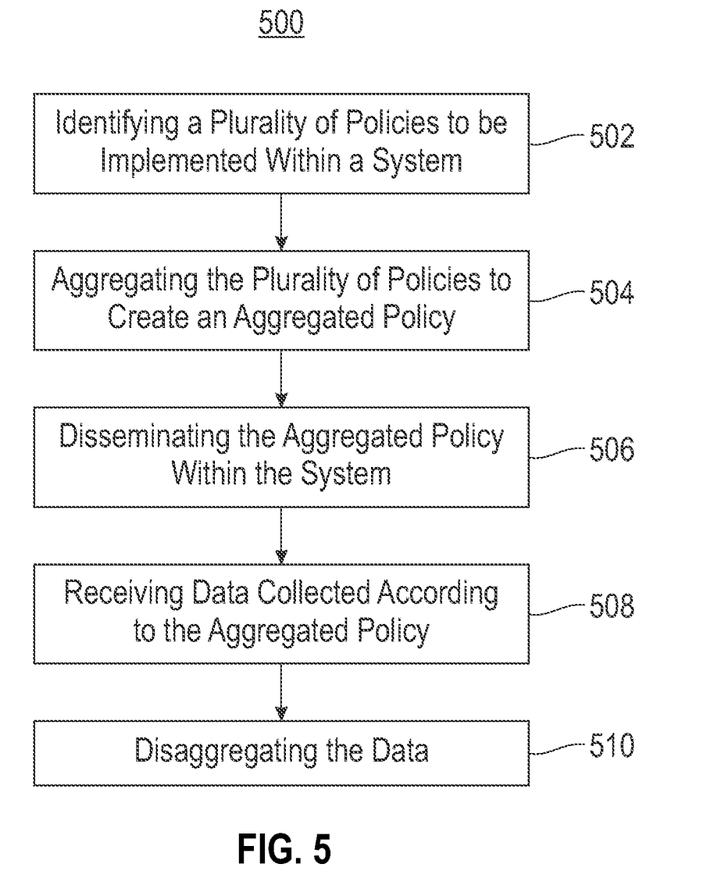
FIG. 5 illustrates a flowchart of a method for performing systemic adaptive data management, in accordance with one embodiment.

Now referring to FIG. 5, a flowchart of a method 500 is shown according to one embodiment. The method 500 may be performed in accordance with the present invention in any of the environments depicted in FIGS. 1-4 and 6, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a plurality of policies to be implemented within a system are identified. In one embodiment, the system may include an internet of things (IoT) environment. For example, the IoT environment may include a network of physical devices capable of collecting and exchanging data. In another embodiment, the system may include one or more nodes. For example, the nodes may include one or more edge nodes that instruct one or more end devices to perform one or more actions, and retrieve data collected as a result of the one or more actions. In another example, exemplary edge nodes may include devices capable of communicating data to and from end devices, such as one or more routers, one or more transceivers, etc.

Additionally, in one embodiment, the nodes may include one or more end devices that perform one or more data acquisition actions. For example, exemplary end devices may include devices capable of acquiring data, such as one or more digital cameras, one or more motion sensors, one or more temperature probes, etc. In another embodiment, each of the plurality of policies includes details regarding one or more of data collection, processing and storage within the system.

For example, each policy may include an identification of one or more types of data to be collected from within the system (e.g., one or more of video, audio, text, etc.). In another example, each policy may include an identification of how, when, and where the collected data is to be processed within the system. For instance, processing details may be specific to a predetermined type of collected data.

In another example, each policy may include an identification of data to be stored, as well as a location where the data is to be stored within the system. For instance, the location may include a specific data storage device within the system. In another example, the location may include a specific level within the system (e.g., cloud computing/storage level, edge level, etc.).

Further, in one embodiment, the plurality of policies may be received from one or more tenants (e.g., one or more applications running within the system, one or more applications running externally from the system, one or more end users, one or more private devices, one or more shared devices, etc.). In another embodiment, a first policy of the plurality of policies may be associated with a first tenant, and a second policy of the plurality of policies separate from the first policy may be associated with a second tenant separate from the first tenant.

Further still, method 500 may proceed with operation 504, where the plurality of policies are aggregated to create an aggregated policy. In one embodiment, each of the plurality of policies may include a plurality of characteristics. For example, the characteristics include volume, variety, velocity, veracity, and value. In another embodiment, the volume characteristic for a policy may include a number of sources from which data is to be collected and/or stored, a location of the sources, etc.

For example, the volume characteristic may indicate that data is to be collected from one or more predetermined locations. In another example, the volume characteristic may indicate that data is to be stored at one or more predetermined locations.

Also, in one embodiment, the variety characteristic for a policy may include one or more types of data to be collected (e.g., textual data, image data, video data, audio data, etc.). For example, the variety characteristic may indicate that both audio and video data is to be collected. In another embodiment, the velocity characteristic for a policy may include a frequency for which data is collected. For example, the velocity characteristic may indicate that data is to be collected every minute, every two minutes, every hour, every day, etc.

In addition, in one embodiment, the veracity characteristic for a policy may include an indication of a level of trust to be assigned to collected data. For example, the veracity characteristic may indicate that data retrieved from a first source has a first authenticity level, that data retrieved from a second source has a second authenticity level greater than or less than the second authenticity level, etc. In another embodiment, the value characteristic for a policy may include an indication of a value to be assigned to collected data. For example, the value characteristic may indicate that data retrieved from a first source has a first value level, that data retrieved from a second source has a second value level greater than or less than the first value, etc.

Furthermore, in one embodiment, all of the plurality of policies may be aggregated in response to determining one or more similarities between each of the plurality of policies. In another embodiment, all of the plurality of policies may be aggregated in response to determined that all policies are to be implemented at the same location within the system.

For example, each of the plurality of policies may have an implementation requirement indicating that the policy is to be implemented at the same location within the system. In another example, a location to implement the policies may be determined based on the characteristics of the policies, and the determined location (e.g., system node, etc.) may be the same for all of the plurality of policies. In yet another example, only policies that are implemented at the same location may be aggregated.

Further still, in one embodiment, aggregating the plurality of policies may include determining a plurality of aggregated characteristics that each satisfy a corresponding plurality of matching characteristics for the plurality of policies. For example, an aggregated volume characteristic may be determined that satisfies all of the volume characteristics of all of the plurality of policies. For instance, if a first volume characteristic of a first policy indicates that data is to be collected from a first and second location, and a second volume characteristic of a second policy indicates that data is to be collected from a second and third location, an aggregated volume characteristic may indicate that data is to be collected from a first, second, and third location.

Also, in one example, an aggregated variety characteristic may be determined that satisfies all of the variety characteristics of all of the plurality of policies. In another example, an aggregated velocity characteristic may be determined that satisfies all of the velocity characteristics of all of the plurality of policies. In yet another example, an aggregated veracity characteristic may be determined that satisfies all of the veracity characteristics of all of the plurality of policies. In still another example, an aggregated value characteristic may be determined that satisfies all of the value characteristics of all of the plurality of policies.

Further, in one embodiment, a state of the system may be considered when aggregating the plurality of policies. For example, the state of the system may include one or more policies that are currently deployed within the system. In another example, characteristics of these currently deployed policies may be determined, and the aggregated policy may be adjusted so that each of the characteristics are met by the aggregated policy. In yet another example, the state of the system may include a description of one or more nodes within the system (e.g., processing/storage capabilities, processing/storage capacities, and/or processing/storage limitations of each of the one or more nodes, etc.), a description of one or more tenants of the system, etc.

Further still, in one embodiment, one or more currently deployed policies to be removed from the system may be considered when aggregating the plurality of policies. For example, characteristics of currently deployed policies to be removed may be determined, and these characteristics may be removed from consideration when creating the aggregated policy. In another embodiment, aggregating the plurality of policies may include combining the plurality of aggregated characteristics to create the aggregated policy. For example, one or more of the aggregated volume characteristic, the aggregated variety characteristic, the aggregated velocity characteristic, the aggregated veracity characteristic, and the aggregated value characteristic may be combined to create the aggregated policy.

Also, method 500 may proceed with operation 506, where the aggregated policy is disseminated within the system. In one embodiment, the aggregated policy may be sent to one or more nodes within the system for implementation. For example, the aggregated policy may be sent to one or more edge nodes, and the edge nodes may then instruct one or more end devices to perform one or more actions that satisfy the aggregated policy.

In addition, in one embodiment, the edge nodes may then retrieve data collected by the end devices as a result of the one or more actions. For example, an edge node may receive an aggregated policy requiring a predetermined type of data at a predetermined interval. The edge node may instruct one or more end devices to acquire the predetermined type of data (e.g., by recording video, audio, or images, by performing one or more optical character recognition operations to obtain textual data, etc.) at the predetermined interval. The edge node may then receive data from the one or more end devices, in response to the instructing. The edge node may then send the received data to a node within the system that sent the aggregated policy.

Furthermore, method 500 may proceed with operation 508, where data collected according to the aggregated policy is received. In one embodiment, the collected data may be obtained in response to the dissemination of the aggregated policy. In another embodiment, the collected data may be received from the one or more nodes to which the aggregated policy was sent. For example, the collected data may be received from one or more edge nodes within the system.

Further still, method 500 may proceed with operation 510, where the data is disaggregated. In one embodiment, disaggregating the data may include, for each of the plurality of policies, determining one or more portions of the received data that match all characteristics of the policy.

Also, in one embodiment, disaggregating the data may include, for each of the plurality of policies, processing and/or storing the matching one or more portions according to details indicated within the matching policy. In another embodiment, disaggregating the data may include, for each of the plurality of policies, sending the matching one or more portions to the tenant from which the policy was received for processing. For example, a first policy received from a first tenant may indicate that a first measurement is to be made every two minutes, and a second policy received from a second tenant may indicate that the first measurement is to be made every three minutes. The policies may be aggregated such that the aggregated policy indicates that the first measurement is to be made at minute times that are multiples of two and three.

Additionally, in one embodiment, the aggregated policy may be disseminated, and data may be collected according to the aggregated policy. For example, the collected data may include instances of the first measurement with timestamps at minute times that are multiples of two and three. In another embodiment, the collected data may be disaggregated and returned to the requesting tenants. For example, instances of the first measurement with timestamps at minute times that are multiples of two may be sent to the first tenant, for processing at the first tenant, and instances of the first measurement with timestamps at minute times that are multiples of three may be sent to the second tenant, for processing at the second tenant.

In this way, any redundant characteristics between the plurality of policies may be removed during the aggregation of the plurality of policies. This may eliminate redundant processing performed by nodes within the system that collect the data according to the aggregated policy, which may improve a performance of such nodes. Additionally, a transfer of redundant data from data collection nodes to data processing nodes may be avoided, and policies may be simplified before they are transmitted for implementation, which may reduce network congestion and improve a performance of one or more network components (e.g., routers, switches, etc.). Further, a storage of redundant data at one or more of end devices, edge nodes, and policy generating entities may be eliminated, which may reduce an amount of stored data, which may improve a performance of such elements within the system.

Additionally, individual policies may be stored at a centralized location, and an aggregated policy based on the individual policies may be sent throughout the system for implementation (e.g., instead of the individual policies). As a result, security may be implemented for the individual policies at the centralized location, and not at a multitude of nodes throughout the system, which may simplify and reduce the implementation of policy security and management within the system.

Figure 6:
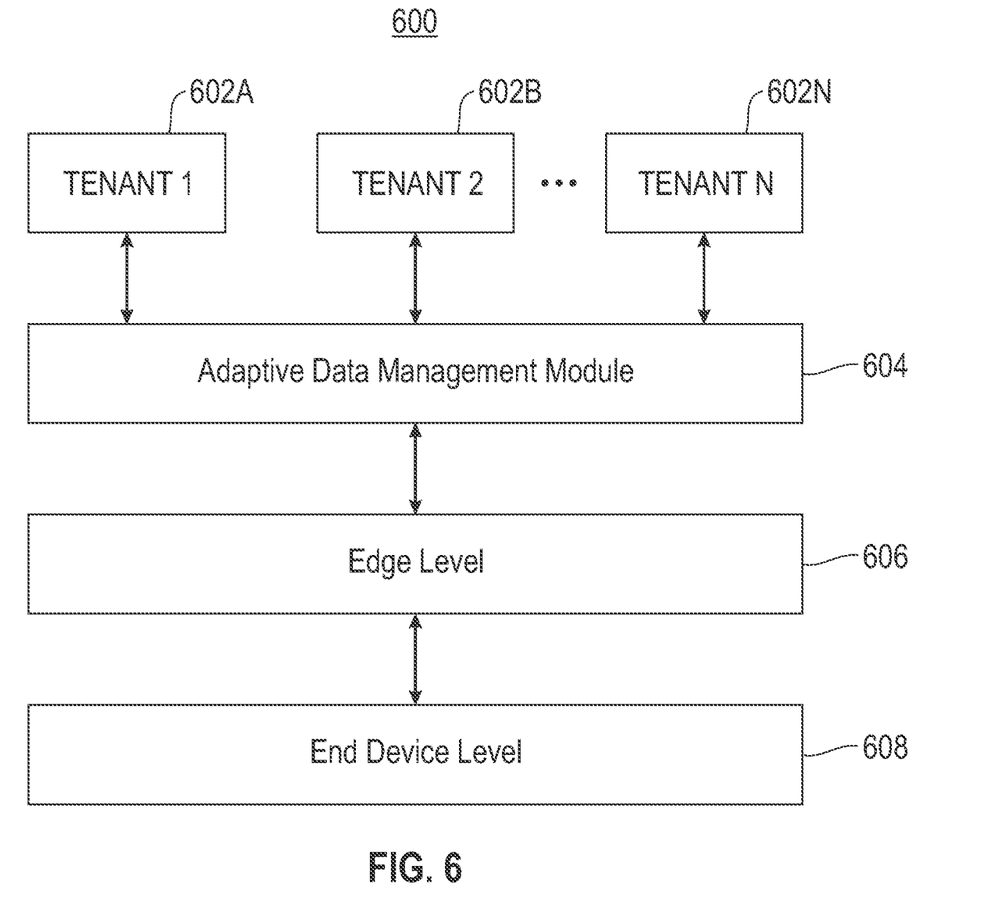
FIG. 6 illustrates an exemplary systemic adaptive data management IoT system, in accordance with one embodiment.

FIG. 6 illustrates an exemplary systemic adaptive data management IoT system 600, according to one embodiment. As shown, a plurality of tenants 602A-N are in communication with an adaptive data management module 604. The plurality of tenants 602A-N may each include one or more applications, one or more end users, etc. In one embodiment, the adaptive data management module 604 may be implemented within a cloud computing environment. In another embodiment, the adaptive data management module 604 may be implemented within one or more computing devices (e.g., servers, etc.).

In one embodiment, one or more of the plurality of tenants 602A-N may send one or more policies to the adaptive data management module 604 for implementation within the system 600. For example, a first tenant 602A may send a first policy to the adaptive data management module 604 for implementation, and a second tenant 602B may send a second policy to the adaptive data management module 604 for implementation.

Upon receipt of the one or more policies, the adaptive data management module 604 may retrieve a description of policies that have already been implemented within the system 600, and may determine all characteristics of such policies. The adaptive data management module 604 may also retrieve a description of policies to be removed from the system 600, and may determine all characteristics of such policies. Additionally, the adaptive data management module 604 may retrieve a state of the system 600. The adaptive data management module 604 may also determine all characteristics of the policies received from the plurality of tenants 602A-N.

Additionally, in one embodiment, the adaptive data management module 604 may create an aggregated policy, based on the characteristics of the policies received from the plurality of tenants 602A-N, the characteristics of the policies that have already been implemented within the system 600, the characteristics of all policies to be removed from the system 600, and the state of the system 600. For instance, the adaptive data management module 604 may implement one or more neural networks to identify specific characteristics of all relevant policies and output an aggregated characteristic that satisfies each of the specific characteristics.

Further, in one embodiment, the adaptive data management module 604 may disseminate the aggregated policy to an edge level 606 within the system 600. In response, edge nodes within the edge level 606 may send one or more instructions to an end device level 608 of the system 600 for implementation. For example, one or more edge nodes within the edge level 606 may instruct one or more end devices within the end device level 608 to obtain data according to the aggregated policy and return the data to the one or more edge nodes.

Further still, in one embodiment, the one or more end devices within the end device level 608 may obtain data according to the aggregated policy, and may return the data to the one or more edge nodes within the edge level 606. The one or more edge nodes may then send the data from the edge level 606 to the adaptive data management module 604. In response to receiving the data, the adaptive data management module 604 may disaggregate the data by determining, for each of the policies received from the plurality of tenants 602A-N, one or more portions of the received data that match all characteristics of the policy.

Also, in one embodiment, the disaggregated data may be returned from the adaptive data management module 604 to the plurality of tenants 602A-N. For example, disaggregated data matching all characteristics of the first policy sent by the first tenant 602A may be sent from the adaptive data management module 604 to the first tenant 602A. Additionally, disaggregated data matching all characteristics of the second policy sent by the second tenant 602B may be sent from the adaptive data management module 604 to the second tenant 602B.

In this way, by creating and disseminating an aggregated policy, a volume of network bandwidth between the adaptive data management module 604 and the edge level 606 may be reduced. Additionally, only a single aggregated policy may need to be stored at the edge level 606, which may reduce an amount of storage utilized by edge nodes within the edge level 606. Further, the obtaining of redundant data by end devices within the end device level 608 may be eliminated, which may improve a performance of the end devices within the end device level 608.

A Method for Systemic Adaptive Data Management in IoT Environments

In one embodiment, there may be two sources of constraints in internet of things (IoT) environments. First, there may be resource constraints, such as constraints on the network capacities, bandwidth, storage, etc. Second, there may be capacity constraints on processes that require human intervention. For instance, there may be a limited capability/capacity for personnel performing surveillance (e.g., users who are scanning monitors connected to multiple cameras in a smart city, etc.).

Additionally, data management in IoT environments may be characterized by the following factors/parameters:
  Volume: we may be collecting large amounts of data, which may be difficult to store and/or process, given available resources.
  Variety: Data may be of different types (e.g., video, images, text, numerical, etc.).
  Velocity: Data may come in different frequency rates.
  Veracity: Some data may be trusted more than others depending on the data source, sensor sensitivity, channel, etc.
  Value: Some data is of more value than others, depending on the objective of its usage.

In another embodiment, there may be objectives and/or needs for IoT environments—the collection, storing, processing, and consumption of data that is "interesting" to users in any specific context.

Given the aforementioned data characteristics and environment constraints, it may be desirable to manage data to support the given objectives/needs, while satisfying constraints and dealing with the above characteristics. The approach may be a systemic approach for data collection, storage, processing, and consumption.

In one embodiment, exemplary inputs may include policies having defined data characteristics, and a current state of the system. Exemplary outputs may include relevant IoT data to be collected, processed, and stored according to the defined policies.

Additionally, in one embodiment, the systemic adaptive data management may be performed utilizing a plurality of steps—policy aggregation, policy dissemination, data collection, and data disaggregation.

Figure 7:
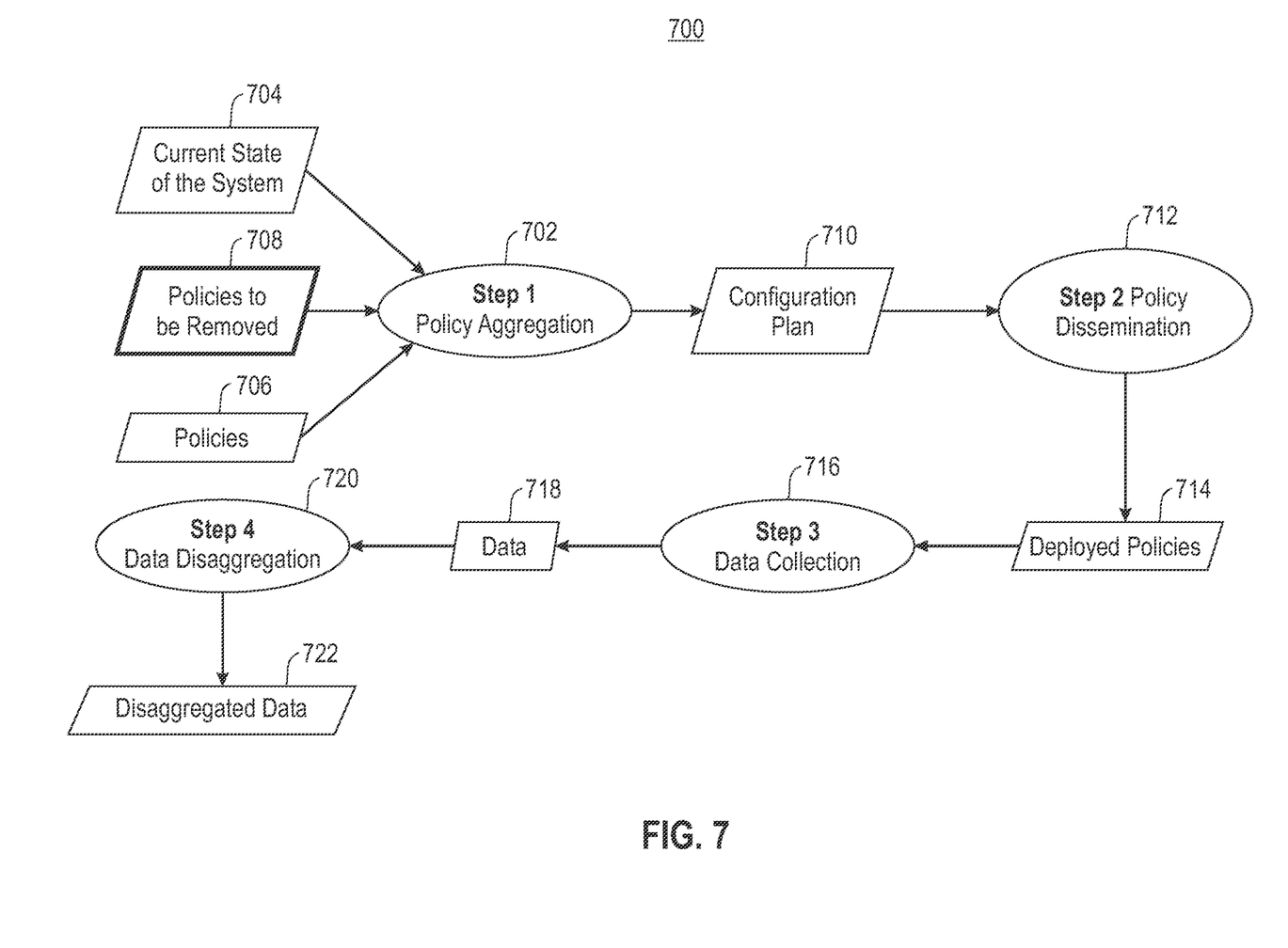
FIG. 7 illustrates an exemplary systemic adaptive data management flow within an IoT environment, in accordance with one embodiment.

FIG. 7 illustrates an exemplary systemic adaptive data management flow 700 within an IoT environment, according to one embodiment.

Policy Aggregation

As shown, the inputs to the policy aggregation step 702 include the current state of the system 704 (e.g., policies that are already deployed and the system's topology), new policies to be deployed within the system 706, and policies to be removed from the system 708, etc. In another embodiment, one or more policies used in the system may be associated with a user.

Additionally, in one embodiment, each policy may determine one or more of the following:
  Data types to be collected (video, audio, text, combinations of multiple types, etc.)
  Which data is to be stored
  Where to store the data (e.g., at an edge level, at a cloud level, etc.)
  How the data is processed for each data type
  When the data is processed for each data type
  Where the data is processed for each data type Further, in one embodiment, the currently deployed policies and the policies to be deployed are aggregated in the policy aggregation step 702. More specifically, when two or more related policies are to be co-located on the same node, an aggregation is made to generate one policy. The aggregation is done at the central location before being disseminated to an edge for implementation.

For example, a first policy may dictate that a particular metric should be monitored once every two minutes. Further, another policy dictates that the same metric should be monitored once every three minutes. An aggregation of the two policies may produce one aggregated policy in which this metric is to be monitored at all minutes divisible by two or three (e.g., minutes 2, 3, 4, 6, 8, 9, 10, 12, etc.).

In another embodiment, each policy determines parameters related to each of the plurality of IoT factors/parameters indicated above. When policies are aggregated during the policy aggregation step 702, the aggregated parameters are determined for each of the same factors. For example, the previous example is related to a "velocity", where the velocity parameter (e.g., monitoring frequency) has been aggregated from the corresponding parameters in the two input policies.

Further still, in one embodiment, the aggregation is typically done for all or some of the above IoT factors/parameters simultaneously. For example: the "value" factor may be parameterized by the location. One policy may state that detection of a first predetermined object from video data collected where a predetermined event happened is of more "value" than other data. Additionally, the data should be collected more frequently in places where there is an increased number of the first predetermined object.

Another policy might state that detection of a second predetermined object from video data collected in the same location is of more "value" because of predetermined criteria. Similarly, data should be collected more frequently where the second predetermined object is found. Aggregating the two policies would result in processing the video data to detect both the first and second predetermined objects, where the data collection would be done more frequently in places where such objects are found. The result of the policy aggregation step 702 is a configuration plan 710.

Policy Dissemination

Additionally, during a policy dissemination step 712, aggregated policies may be deployed 714 on predetermined nodes (i.e., at the edge) of the topology of the system.

Data Collection

Further, during a data collection step 716, data 718 is collected, stored, and processed following the deployed policies.

Data Disaggregation

Further still, during a data disaggregation step 720, using the information stored about policy aggregation, the data may be processed and sent to their associated users. When no aggregation was made, the data is sent as-is to an associated user. When one or more aggregations were made, the data is disaggregated according to the policy that was used to create disaggregated data 722.

For example, where one policy dictates that a particular metric should be monitored once every two minutes and another policy dictates that the same metric should be monitored once every three minutes, the aggregation would produce one aggregated policy in which this metric is to be monitored at times that are multiples of two and multiples of three. The data disaggregation would send the data collected having timestamps that are multiples of two to the requester of the first policy, and would send the data collected in timestamps that are multiples of three to the requester of the second policy.

Note that the disaggregation may be done simultaneously for all of the characteristics used in the aggregation.

In one embodiment, a method for systemic adaptive data management in IoT environments may be implemented, including receiving the current state of the system and policies to be applied to the system, aggregating the existing policies, policies to be deployed, and policies to be removed, disseminating the aggregated policies in the appropriate nodes, collecting the data following the deployed policies, and disaggregating the data.

In another embodiment, parameters related to volume, variety, velocity, veracity and value of the data may be specified. In yet another embodiment, each policy may be associated with a user. In still another embodiment, the related policies to be deployed in the same location may be aggregated at a central system. In another embodiment, the aggregation of the policies may be based on the parameters.

Additionally, in one embodiment, the aggregated policies may be deployed in the appropriate location, and the data may be collected as per the disseminated polices that were aggregated. In another embodiment, the data may be disaggregated as per the disseminated policies that were initially aggregated, where the disaggregation of the data is based on the parameters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
identifying a plurality of policies to be implemented within a system, where the plurality of policies includes a plurality of characteristics, the plurality of characteristics including:
a first characteristic indicating one or more predetermined locations from which data is to be collected,
a second characteristic indicating one or more types of the data to be collected, and
a third characteristic indicating a frequency by which the data is to be collected;
aggregating the plurality of policies to create a single aggregated policy, where the aggregated policy includes a combination of:
an aggregated first characteristic that satisfies all of the first characteristics of all of the plurality of policies,
an aggregated second characteristic that satisfies all of the second characteristics of all of the plurality of policies, and
an aggregated third characteristic that satisfies all of the third characteristics of all of the plurality of policies;
disseminating the aggregated policy within the system;
receiving data collected according to the aggregated policy; and
disaggregating the data.

2. The computer-implemented method of claim 1, wherein a state of the system is considered when aggregating the plurality of policies.

3. The computer-implemented method of claim 1, wherein one or more currently deployed policies to be removed from the system are considered when aggregating the plurality of policies.

4. The computer-implemented method of claim 1, the plurality of characteristics including a veracity characteristic indicating a level of trust to be assigned to the collected data.

5. The computer-implemented method of claim 1, wherein the plurality of policies are aggregated in response to determining one or more similarities between each of the plurality of policies.

6. The computer-implemented method of claim 1, further comprising:
identifying one or more current policies that are currently deployed within the system;
determining characteristics of the one or more current policies; and adjusting the aggregated policy so that each of the characteristics of the one or more current policies are met by the aggregated policy.

7. The computer-implemented method of claim 1, the plurality of characteristics including a value characteristic indicating a value to be assigned to the collected data.

8. The computer-implemented method of claim 1, wherein each of the plurality of policies is associated with a tenant.

9. The computer-implemented method of claim 1, wherein the aggregated policy is disseminated to one or more edge nodes separate from a central system.

10. The computer-implemented method of claim 1, wherein disaggregating the data includes, for each policy of the plurality of policies:
   determining one or more portions of the data that match all characteristics of the policy, and
   sending the matching one or more portions of the data to a tenant from which the policy was received.

11. The computer-implemented method of claim 1, wherein disaggregating the data includes, for each policy of the plurality of policies:
   determining one or more portions of the data that match all characteristics of the policy, and
   processing and storing the matching one or more portions according to details indicated within the policy.

12. A computer program product comprising one or more computer readable storage media, and program instructions collectively stored on the one or more computer readable storage media, the program instructions comprising instructions configured to cause one or more processors to perform a method comprising:
   identifying, by the one or more processors, a plurality of policies to be implemented within a system, where the plurality of policies includes a plurality of characteristics, the plurality of characteristics including:
      a first characteristic indicating one or more predetermined locations from which data is to be collected,
      a second characteristic indicating one or more types of the data to be collected, and
      a third characteristic indicating a frequency by which the data is to be collected;
   aggregating, by the one or more processors, the plurality of policies to create a single aggregated policy, where the aggregated policy includes a combination of:
      an aggregated first characteristic that satisfies all of the first characteristics of all of the plurality of policies,
      an aggregated second characteristic that satisfies all of the second characteristics of all of the plurality of policies, and
      an aggregated third characteristic that satisfies all of the third characteristics of all of the plurality of policies;
   disseminating, by the one or more processors, the aggregated policy within the system;
   receiving, by the one or more processors, data collected according to the aggregated policy; and
   disaggregating, by the one or more processors, the data.

13. The computer program product of claim 12, wherein a state of the system is considered when aggregating the plurality of policies.

14. The computer program product of claim 12, wherein one or more currently deployed policies to be removed from the system are considered when aggregating the plurality of policies.

15. The computer program product of claim 12, the plurality of characteristics including a veracity characteristic indicating a level of trust to be assigned to the collected data.

16. The computer program product of claim 12, wherein the plurality of policies are aggregated in response to determining one or more similarities between each of the plurality of policies.

17. The computer program product of claim 12, the plurality of characteristics including a value characteristic indicating a value to be assigned to the collected data.

18. A computer-implemented method, comprising:
   identifying a plurality of policies to be implemented within a system, where the plurality of policies include characteristics including:
      an indication of one or more predetermined locations from which data is to be collected,
      an indication of one or more predetermined locations where the collected data is to be stored,
      an indication of one or more types of the data to be collected,
      an indication of a frequency by which the data is to be collected,
      an indication of a level of trust to be assigned to the collected data, and
      an indication of a value to be assigned to the collected data;
   aggregating the plurality of policies to create a single aggregated policy in response to determining one or more similarities between characteristics of each of the policies, the aggregating including determining a plurality of aggregated characteristics that each satisfy a corresponding plurality of matching characteristics for each of the plurality of policies;
   disseminating the aggregated policy within the system;
   receiving the data collected according to the aggregated policy; and
   disaggregating the data.

* * * * *